Aug. 9, 1966

D. P. WESTMAN 3,265,150

AUTOMATIC RETURN TO NEUTRAL MECHANISM
FOR VEHICLE TRANSMISSION
Filed Dec. 1, 1964

Inventor
Dean P. Westman
By Charles L. Schwab
Attorney

United States Patent Office 3,265,150
Patented August 9, 1966

3,265,150
AUTOMATIC RETURN TO NEUTRAL MECHANISM FOR VEHICLE TRANSMISSION
Dean P. Westman, South Chicago Heights, Ill., assignor to Allis-Chalmers Manufacturing Company, Milwaukee, Wis.
Filed Dec. 1, 1964, Ser. No. 414,953
5 Claims. (Cl. 180—82)

This invention relates to an automatic return to neutral mechanism for a vehicle transmission and particularly to a mechanism which forces the transmission to be in neutral upon the operator's seat being vacated.

Heretofore a variety of mechanisms have been proposed and utilized to shift a vehicle transmission to neutral upon the operator's seat being vacated. One such prior art mechanism is shown in U.S. Patent Number 2,931,454, Seat Actuated Clutch Disengaging Mechanism, issued April 5, 1960, to Frank C. Schuster, wherein a special valve dumps the hydraulic pressure in the fluid operated transmission clutches upon the operator's seat being unoccupied. In using this prior art transmission disengaging mechanism it is possible for the operator to leave the truck with the regular transmission control valve in a clutch actuating position. When the operator leaves the seat the special dumping valve, of course, relieves the pressure in the fluid actuated clutches and they are disengaged to neutralize the transmission so long as the operator is off the seat. However, the operator may forget that he left the truck with the transmission control valve in a drive establishing position and when he again places his weight upon the seat, the truck will immediately begin to move. This is not entirely satisfactory from a safety standpoint since the immediate movement of the truck may be unexpected.

It is a primary object of this invention to provide a means for returning the manually operated transmission control to a neutral position when the operator's seat is vacated.

It is a further object of this invention to provide a seat actuated return to neutral mechanism for a vehicle transmission wherein the operator must shift the transmission to a drive establishing position upon return to the opertor's seat to effect powered movement of the vehicle.

It is a further object of this invention to provide an improved return to neutral control as set forth in the previous object using inexpensive components.

It is a further object of this invention to provide an improved return to neutral mechanism for a vehicle transmission which not only utilizes inexpensive mechanical components, but is also easily installed and serviced.

These and other objects and advantages of this invention will be apparent to those familiar with the art when the following description is read in conjunction with the drawings in which.

Figures 1, 2:
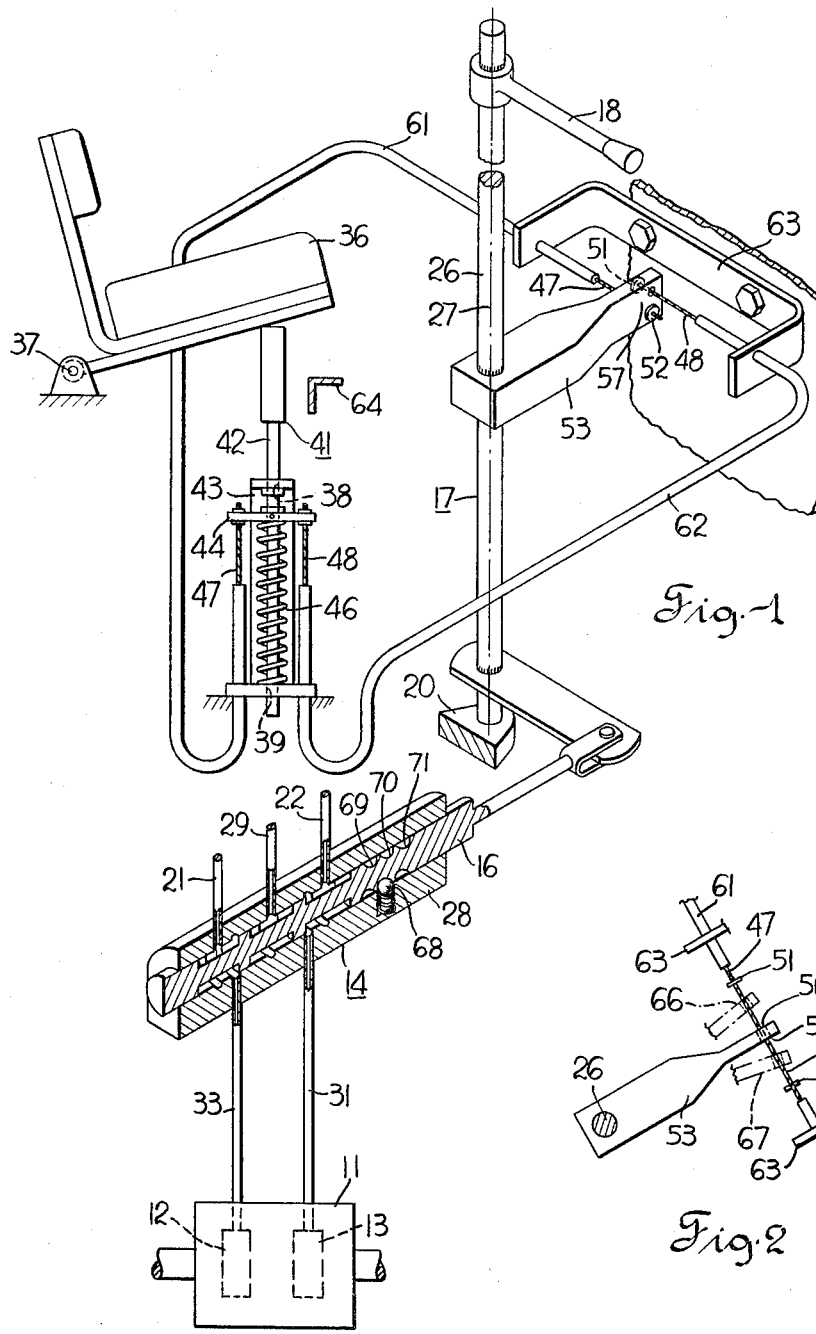
FIG. 1 shows my invention schematically as utilized in a vehicle with power shift transmission.
FIG. 2 is a top view of a part of the control mechanism illustrated in FIG. 1.

As illustrated in the drawings my invention is incorporated in a vehicle having a power shift transmission 11 which includes fluid operated forward and reverse clutches 12, 13, controlled by a transmission control valve 14. The spool 16 of valve 14 is operated by a control linkage 17 which includes a manual control lever 18 at the operator's station, a shaft 26 and an arm pivotally connected to valve spool 16. The bottom end of shaft 26 is pivotally mounted in chassis part 20 for rotation about axis 27. The linkage 17 and valve spool 16 are illustrated in a neutral position wherein the clutches 12, 13 are connected to return to reservoir passages 21, 22, respectively.

When the operating lever 18 is rotated counterclockwise about its pivot axis 27, the valve spool 16 will be pulled out of the valve housing 28 to a detented drive establishing position wherein fluid supplied from an engine driven pump, not shown, through conduit 29 is delivered to reserve clutch 13 through conduit 31. When the manual control lever 18 is moved clockwise the spool 16 slides into the housing 28 to a second drive establishing position wherein pressure fluid from conduit 29 is supplied to and actuates forward clutch 12 by way of conduit 33.

As illustrated in FIG. 1, the operator's seat has been vacated and a spring loaded plunger 41 forces the seat 36 to be pivoted upwardly about its pivot 37 to the unoccupied position in which shown. A reduced diameter portion 42 of plunger 41 is piloted in bores 38, 39 of a bracket 43 secured to the vehicle chassis and carries a cross bar 44 against which biasing means in the form of a compression spring 46 acts. Thus, through the plunger 41 the cables 47, 48 have a thrust transmitting connection with the seat assembly 36. As shown in FIG. 1, the cables 47, 48 have been shifted in the direction toward the seat thereby bringing abutments 51, 52, secured to their ends, into closely adjacent relation to a radially extending element 53 secured to and rotatable with control linkage shaft 26. In this position of the abutments 51, 52, the element 53 and the transmission linkage is forced to occupy its illustrated neutral position by virtue of the confronting engageable relation between the abutments 51, 52 and abutment surfaces 56, 57 on element 53. Element 52 is also provided with a pair of guide openings through which the cables 47, 48 extend to thus complete a lost motion connection between the cables and element 53. The cables 47, 48 are carried in suitable sheathing 61, 62 secured to the chassis by brackets 43 and 63 on the vehicle chassis so that they act in the manner of a Bowden wire mechanism.

When the seat assembly 36 is occupied, the operator's weight is sufficient to compress spring 46 and move the seat to its occupied position wherein it abuts chassis part 64. This movement depresses the plunger 41, thereby extending the cables 47, 48 in the direction away from the seat causing their abutments 51, 52 to occupy the position illustrated in FIG. 2. In this position of the cables 47, 48 and their abutments 51, 52, the control element 53, along with other parts of linkage 17, may be moved to drive establishing positions 66, 67 which corresponds to the drive establishing positions of the control valve 14.

It should be noted that the cable abutments 51, 52 contact the spaced abutment surfaces 56, 57 at points spaced sufficiently from the axis 27 of the shift linkage to provide the leverage necessary to permit the spring 46 to not only raise the seat, but also shift the valve spool 16 in opposition to the spring biased detent 68. Once the valve spool 16 has been shifted from one of the drive establishing positions, in which detent 68 engages recess 69 or 71, to its neutral position, in which detent 68 engages recess 70, the operator on returning to the vehicle seat must manually operate the control linkage before the vehicle can again be moved under its own power.

The embodiments of the invention for which an exclusive property or privilege is claimed are defined as follows:

1. Means for automatically insuring that a vehicle transmission is in neutral when the operator leaves the vehicle, comprising:
an operator's seat mounted on said vehicle for vertical movement relative thereto between an occupied position and an upwardly disposed unoccupied position,
means for shifting said transmission to and from neutral and drive establishing conditions including a manually operated shifting linkage having neutral and drive establishing position, and
means interposed between said seat and said linkage forcing said linkage to occupy its neutral position when the operator's seat is unoccupied including
- a pair of cables having corresponding ends connected to said linkage,
- a thrust transmitting connection between said cables and said seat, and
- spring means for moving said seat to its unoccupied position when vacated by the operator and for urging said cables axially in the direction away from said linkage and toward said seat.

2. An automatic return to neutral mechanism for a transmission of a vehicle comprising:
- an operator's seat mounted on said vehicle for movement between an occupied position and a raised unoccupied position,
- a transmission control linkage having an element mounted on said vehicle for rotary movement relative thereto about a pivot axis in opposite directions from a neutral position to drive establishing positions,
- a pair of cables mounted on said vehicle for shifting movement along their axes, respectively,
- lost motion connections between one end of each of said cables and portions of said element spaced from said pivot axis,
- spring means on said support in thrust transmitting relation to said seat urging the latter toward its unoccupied position and for urging said cables axially to one extreme of their lost motion connections with said element whereby the latter is forced to be in its neutral position when said seat is unoccupied.

3. An automatic return to neutral mechanism for a transmission, of a vehicle comprising:
- an operator's seat assembly mounted on said vehicle for movement from an occupied position vertically upwardly to an unoccupied position,
- a spring assembly operative to move said seat assembly to its unoccupied position when unoccupied,
- a transmission control element shiftable in opposite directions from a neutral position to drive establishing positions and presenting a pair of oppositely facing abutment surfaces,
- a pair of axially shiftable cables connected to one of said assemblies and having ends extending in opposite directions adjacent said element, and
- abutments on said ends of said cables, respectively, in confronting engageable relation to said abutment surfaces of said element, said abutments forcing said element to occupy its neutral position when said seat is in its unoccupied position.

4. An automatic return to neutral mechanism for the transmission of a vehicle, comprising:
- an operator's seat mounted on said vehicle and biased to move from an occupied position upwardly to an unoccupied position upon being vacated,
- a transmission control element operatively connected to said transmission and movable in opposite directions from a neutral position to first and second drive establishing positions,
  - abutments surfaces on said element spaced from one another in the direction of movement of said element,
  - a pair of cables mounted on said vehicle for shifting movement in the direction of their axes and having abutments connected thereto in confronting engageable relation to said abutment surfaces, respectively,
  - means forming a thrust transmitting connection between said seat and said cables forcing the latter to move in the direction of their axes upon said seat moving from said occupied position to said unoccupied position whereby the abutments on said cables cooperate with said abutment surfaces to prevent said element from moving in opposite directions, respectively, from its neutral position only when said seat is in its unoccupied position.

5. The structure set forth in claim 4 wherein said movement of said element is pivotal movement about an axis, and wherein said abutments are spaced from said axis.

References Cited by the Examiner
UNITED STATES PATENTS

| | | | |
|---|---|---|---|
| 1,461,544 | 7/1923 | Post | 74—502 |
| 1,664,042 | 3/1928 | McGinley | 180—82 |
| 2,204,265 | 6/1940 | Wentzel | 180—82 |
| 2,823,755 | 2/1958 | Hall | 180—82 |
| 2,931,454 | 4/1960 | Schuster | 180—82 |

KENNETH H. BETTS, *Primary Examiner.*